(12) United States Patent
Perisetty et al.

(10) Patent No.: US 7,629,831 B1
(45) Date of Patent: Dec. 8, 2009

(54) BOOSTER CIRCUIT WITH CAPACITOR PROTECTION CIRCUITRY

(75) Inventors: Srinivas Perisetty, Santa Clara, CA (US); Jeffery Chow, San Jose, CA (US)

(73) Assignee: Altera Corporation, San Jose, CA (US)

( * ) Notice: Subject to any disclaimer, the term of this patent is extended or adjusted under 35 U.S.C. 154(b) by 7 days.

(21) Appl. No.: 11/546,597

(22) Filed: Oct. 11, 2006

(51) Int. Cl.
*G05F 1/10* (2006.01)

(52) U.S. Cl. ............................. 327/536; 363/59; 363/60

(58) Field of Classification Search ................. 327/536; 363/59, 60
See application file for complete search history.

(56) References Cited

U.S. PATENT DOCUMENTS

| | | | |
|---|---|---|---|
| 5,008,799 A * | 4/1991 | Montalvo | 363/60 |
| 5,059,815 A * | 10/1991 | Bill et al. | 327/536 |
| 5,175,448 A | 12/1992 | Fujii | |
| 5,180,928 A * | 1/1993 | Choi | 327/541 |
| 5,543,668 A * | 8/1996 | Fong | 307/110 |
| 5,689,208 A * | 11/1997 | Nadd | 327/390 |
| 6,008,690 A | 12/1999 | Takeshima | |
| 6,072,358 A * | 6/2000 | Hung et al. | 327/536 |
| 6,208,197 B1 * | 3/2001 | Ternullo et al. | 327/536 |
| 6,297,974 B1 * | 10/2001 | Ganesan et al. | 363/60 |
| 6,501,326 B2 * | 12/2002 | Fujii et al. | 327/536 |
| 6,570,434 B1 * | 5/2003 | Hsu et al. | 327/536 |
| 6,603,346 B2 | 8/2003 | Sawada et al. | |
| 6,608,782 B2 * | 8/2003 | Hirano | 365/189.09 |
| 6,738,292 B2 * | 5/2004 | Shioyama | 365/185.23 |
| 6,781,440 B2 * | 8/2004 | Huang | 327/537 |
| 6,812,773 B1 * | 11/2004 | Chou | 327/536 |
| 6,960,955 B2 | 11/2005 | Nonaka | |
| 7,042,275 B2 | 5/2006 | Suwa et al. | |

* cited by examiner

*Primary Examiner*—Kenneth B. Wells
(74) *Attorney, Agent, or Firm*—Treyz Law Group; G. Victor Treyz; David C. Kellogg

(57) ABSTRACT

Booster circuitry is provided that contains capacitor protection circuitry. The booster circuitry receives a digital input signal on an input line and provides a corresponding boosted digital output signal on an output line. The digital input signal may be received from an oscillator. The digital output signal may be a clock that is applied to a charge pump on a programmable logic device integrated circuit. The booster circuitry contains a metal-oxide-semiconductor capacitor. The capacitor protection circuitry ensures that the voltage across the capacitor in the booster circuit remains above a desired minimum voltage and below a desired maximum voltage during operation. The capacitor protection circuitry includes a control circuit that monitors the capacitor voltage when the booster circuit is operated while the oscillator is off and transistor-based circuitry that discharges one of the capacitor's terminals to a predetermined level when the booster circuit is operated while the oscillator is on.

15 Claims, 14 Drawing Sheets

BOOSTER CIRCUIT WITH CAPACITOR PROTECTION CIRCUITRY

BACKGROUND

This invention relates to booster circuits such as booster circuits for boosting clock signals for charge pumps in programmable logic device integrated circuits, and more particularly, to booster circuits with capacitor protection circuitry.

Integrated circuits generally have a number of power pins and data pins. An integrated circuit's data pins are used to receive input signals from other integrated circuits and other signal sources. An integrated circuit's data pins are also used to provide output signals to components that are connected to the integrated circuit. Power pins are used to provide power supply voltages to an integrated circuit. In a typical digital integrated circuit, power pins may be used to receive a ground power supply voltage of 0 volts, a logic-level power supply voltage of 1.0 volts, and an elevated power supply voltage of 2.5 volts.

Circuit designers strive to use power pins efficiently. There is a reluctance to add power pins to an integrated circuit, even if a particular circuit design requires a power supply voltage that is not readily available from existing power supply pins. When extra power supply pins are added to an integrated circuit, the integrated circuit die must be made larger to accommodate the extra power supply pins or existing data pins must be converted to power supply pins. Increasing the size of the integrated circuit die can be expensive and can reduce device yields. At the same time, converting data pins to power pins is generally not desirable because this reduces the number of pins that are available for input and output operations and may require the integrated circuit to operate more slowly than would otherwise be necessary.

To avoid using additional power supply pins, circuit designers use on-chip voltage generation circuitry to generate new power supply voltages from the standard power supply voltages that are already available. If, as an example, a new power supply voltage of −0.5 volts is required, an on-chip voltage generator can be used to produce this voltage from standard ground and positive power supply voltages that are available from existing power supply pins. By generating the new power supply voltage using on-chip circuitry, it is not necessary to use an additional power supply pin to receive the new power supply voltage. System design tasks are also simplified, because it is not necessary to externally produce the new power supply voltage.

One popular type of on-chip voltage generator is based on charge-pump circuitry. Charge pumps contain a number of stages. The stages in a charge pump are driven by true and complementary versions of a clock signal. The size of the clock signal influences the efficiency of the charge pump. If a relatively low voltage clock signal is used, a charge pump may need to use a large number of stages to successfully produce its desired output voltage. If a relatively larger voltage clock signal is used, each stage of the charge pump will operate more effectively, so that fewer stages are required. By reducing the number of stages in the charge pump, circuit real estate consumption can be minimized.

A booster circuit can be used to increase the magnitude of a digital signal such as a charge pump clock. Booster circuits contain capacitors. With a conventional booster architecture, a thick-oxide capacitor is used that is able to withstand large voltages. Such thick-oxide capacitors exhibit a low capacitance per unit of surface area on an integrated circuit. As a result, conventional booster circuits consume large amounts of circuit real estate.

It would therefore be desirable to be able to produce booster circuits for boosting charge pump clock signals and other digital signals on integrated circuits such as programmable logic device integrated circuits.

SUMMARY

In accordance with the present invention, a booster circuit is provided that contains capacitor protection circuitry. The booster circuit may be used on an integrated circuit such as a programmable logic device integrated circuit.

The booster circuit receives a digital input signal on an input line and provides a corresponding boosted digital output signal on an output line. The digital input signal may be received from an oscillator. The digital output signal may be a clock that is applied to a charge pump. By increasing the size of the clock that is applied to the charge pump, the performance of the charge pump is enhanced.

The booster circuit contains a metal-oxide-semiconductor capacitor. The capacitor may be fabricated using a thin gate oxide to ensure that the area of the booster circuit is minimized. The capacitor protection circuitry in the booster circuit ensures that the voltage across the capacitor remains above a desired minimum voltage and below a desired maximum voltage during operation.

The booster circuit operates when the oscillator is on (oscillator-on mode) and when the oscillator is off (oscillator-off mode). When the oscillator is on, transistor-based circuitry that is connected on one of the capacitor's terminals is used to discharge that terminal to a predetermined safe voltage level. When the oscillator is off, a control circuit is used to monitor the voltage across the capacitor and produce a corresponding control signal. The control signal is applied to the gate of a transistor. If the voltage across the capacitor becomes too high, the control signal turns the transistor on and decreases the voltage across the capacitor. Hysteresis can be built into the control circuit so that the transistor is not toggled excessively.

Further features of the invention, its nature and various advantages will be more apparent from the accompanying drawings and the following detailed description.

DETAILED DESCRIPTION

The present invention relates to booster circuits for integrated circuits. The integrated circuits in which the booster circuits are used may be any suitable type of integrated circuits such as microprocessors, digital signal processors, application specific integrated circuits, and programmable logic devices. The booster circuitry receives digital input signals and produces corresponding boosted digital output signals. The booster circuitry may be used in any suitable application on an integrated circuit in which it is desired to increase the strength of a digital signal. With one particularly suitable arrangement, the booster circuits are used to boost the voltages of clock signals that are used to clock charge pump circuitry on integrated circuits such as programmable logic devices.

Programmable logic device integrated circuits can be customized using configuration data. In a typical scenario, a logic designer uses a computer-aided design (CAD) system in designing a desired logic circuit. The computer-aided design system uses information on the hardware capabilities of a programmable logic device to generate configuration data.

Programmable logic devices contain programmable elements. The programmable elements may be based on any suitable programmable technology such as fuses, antifuses, laser-programmed elements, electrically-programmed elements, non-volatile memory elements, volatile memory elements, mask-programmed elements, etc. In a typical scenario, the programmable elements are based on random-access memory (RAM) cells. Mask-programmed devices are programmed during device fabrication.

To customize a typical programmable logic device such as a RAM-based device to implement a desired logic circuit, configuration data produced by a computer-aided design system is loaded into programmable memory elements on the device. During operation of the programmable logic device, each memory element provides a static output signal based on its loaded configuration data. The output signals from the memory elements are applied to n-channel and p-channel metal-oxide-semiconductor transistors in regions of programmable logic on the programmable logic device. This configures the programmable logic of the device so that the programmable logic device implements the desired logic circuit.

Figure 1:
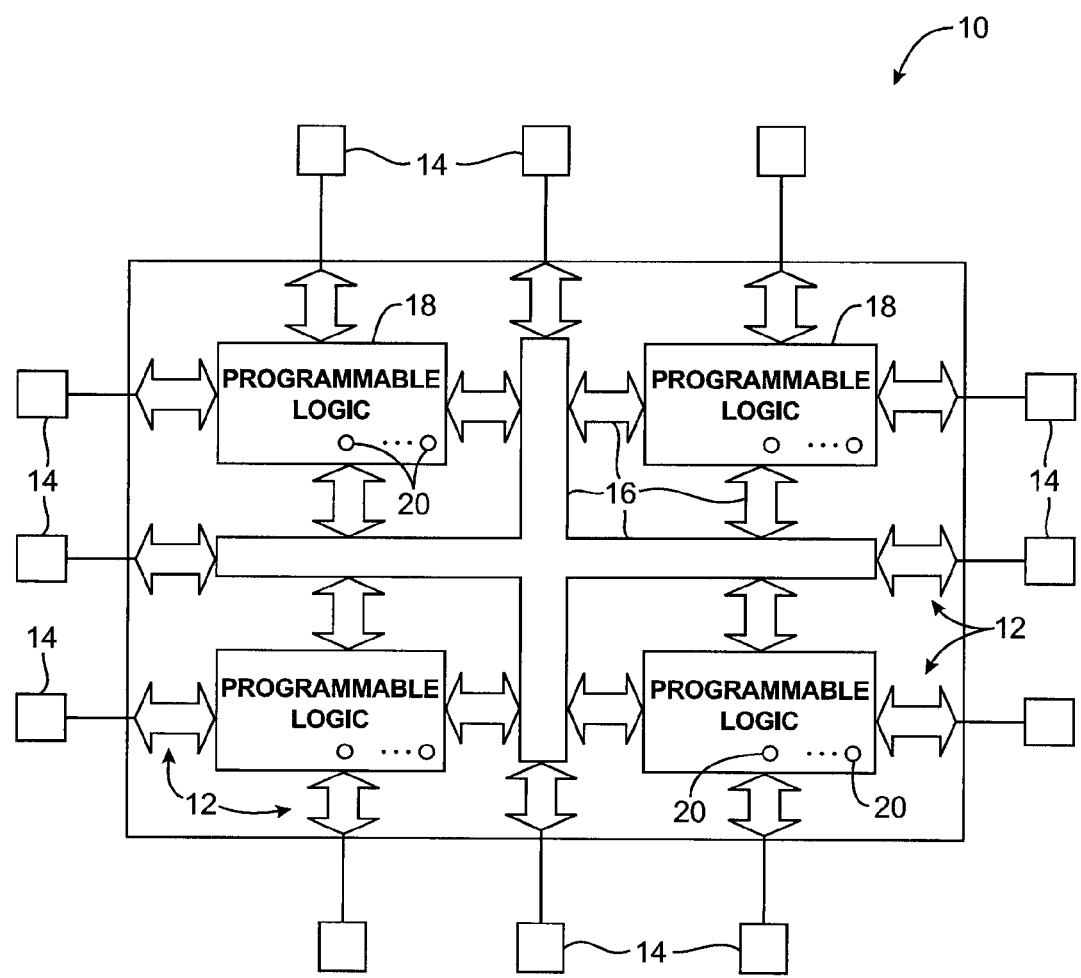
FIG. 1 is a diagram of an illustrative programmable logic device integrated circuit in accordance with the present invention.

An illustrative programmable logic device 10 in accordance with the present invention is shown in FIG. 1. Programmable logic device 10 has input-output circuitry 12 for driving signals off of device 10 and for receiving signals from other devices via input-output pins 14. Interconnection resources 16 such as global and local vertical and horizontal conductive lines and busses are used to route signals on device 10. Interconnection resources 16 include fixed interconnects (conductive lines) and programmable interconnects (i.e., programmable connections between respective fixed interconnects). Programmable logic 18 may include combinational and sequential logic circuitry. The programmable logic 18 may be configured to perform a custom logic function. The programmable interconnects associated with interconnection resources 16 may be considered to be a part of programmable logic 18.

Programmable logic device 10 contains programmable elements 20 such as random-access memory cells that can be loaded with configuration data (also called programming data) using pins 14 and input-output circuitry 12. Once loaded, the programmable elements each provide a corresponding static control output signal that controls the state of an associated logic component in programmable logic 18. The programmable element output signals are typically used to control the gates of metal-oxide-semiconductor (MOS) transistors. Most of these transistors are generally n-channel metal-oxide-semiconductor (NMOS) pass transistors in programmable components such as multiplexers, look-up tables, logic arrays, AND, OR, NAND, and NOR logic gates, etc. When a programmable element output is high, the pass transistor controlled by that programmable element is turned on and passes logic signals from its input to its output. When the programmable element output is low, the pass transistor is turned off and does not pass logic signals.

The programmable elements may be loaded from any suitable source. In a typical arrangement, the programmable elements are loaded from an external erasable-programmable read-only memory and control chip called a configuration device via pins 14 and input-output circuitry 12.

The circuitry of device 10 may be organized using any suitable architecture. As an example, the logic of programmable logic device 10 may be organized in a series of rows and columns of larger programmable logic regions each of which contains multiple smaller logic regions. The logic resources of device 10 may be interconnected by interconnection resources 16 such as associated vertical and horizontal conductors. These conductors may include global conductive lines that span substantially all of device 10, fractional lines such as half-lines or quarter lines that span part of device 10, staggered lines of a particular length (e.g., sufficient to interconnect several logic areas), smaller local lines, or any other suitable interconnection resource arrangement. If desired, the logic of device 10 may be arranged in more levels or layers in which multiple large regions are interconnected to form still larger portions of logic. Still other device arrangements may use logic that is not arranged in rows and columns.

Figure 2:
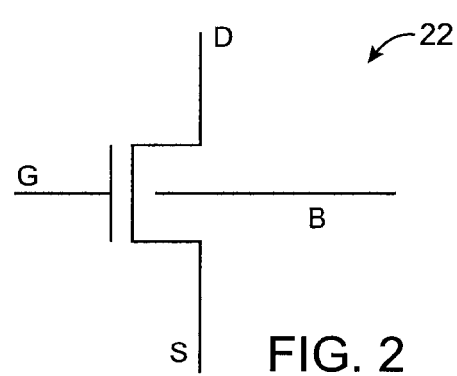
FIG. 2 is a diagram of an n-channel metal-oxide-semiconductor transistor in accordance with the present invention.

The transistors on device 10 have four terminals—a source, a drain, a gate, and a body. The source and drain terminals of metal-oxide-semiconductor transistors are sometimes referred to collectively as source-drain terminals or source-drains. A schematic diagram of an illustrative n-channel metal-oxide-semiconductor transistor 22 is shown in FIG. 2. The source of transistor 22 is labeled S, the drain is labeled D, the gate is labeled G, and the body is labeled B. Source S and drain D are source-drains.

Figure 3:
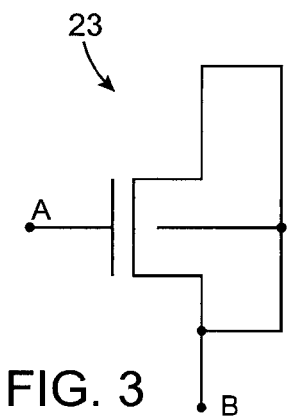
FIG. 3 is a diagram of a capacitor formed from an n-channel metal-oxide-semiconductor transistor in accordance with the present invention.
Figure 4:
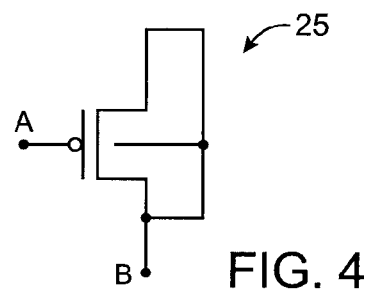
FIG. 4 is a diagram of a capacitor formed from a p-channel metal-oxide-semiconductor transistor in accordance with the present invention.
Figure 5:
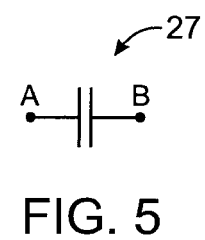
FIG. 5 is a diagram of a capacitor formed from an n-channel or p-channel metal-oxide-semiconductor transistor in accordance with the present invention.

When the drain, source, and body terminals of a metal-oxide-semiconductor transistors such as transistor 22 of FIG. 2 are shorted together, the transistor forms a metal-oxide-semiconductor capacitor. A capacitor 23 that is based on an n-channel metal-oxide-semiconductor transistor is shown in FIG. 3. The two terminals of the capacitor are labeled A and B. A capacitor 25 that is formed from a p-channel metal-oxide-semiconductor transistor 25 is shown in FIG. 4. Transistor-based capacitors such as capacitor 23 of FIG. 3 and capacitor 25 of FIG. 4 are represented schematically as shown by capacitor 27 of FIG. 5.

In a given circuit, a metal-oxide-semiconductor capacitor can be formed using an n-channel or a p-channel transistor. In general, a circuit designer will use whichever transistor structure produces the largest capacitance for a given area.

Figure 6:
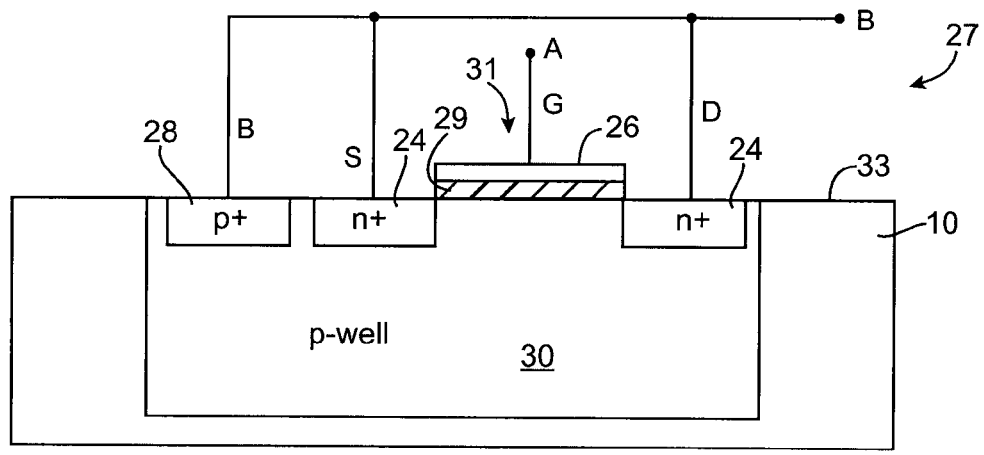
FIG. 6 is a cross-sectional side view of an illustrative integrated circuit capacitor formed from an n-channel metal-oxide-semiconductor transistor in accordance with the present invention.

A cross-sectional side view of capacitor 27 when formed using the n-channel arrangement of capacitor 23 of FIG. 3 is shown in FIG. 6. Source S and drain D are formed using implant regions 24 in the surface 33 of integrated circuit 10. Gate structure 31 is formed from a thin layer of insulator 29 such as silicon oxide and a gate conductor 26 such as silicided polysilicon. Because the insulator 29 is typically formed using at least some silicon oxide, insulator 29 is typically referred to as the gate "oxide," regardless of its exact composition. Body terminal B uses implant region 28 to form an ohmic contact with p-type body region 30.

Transistor capacitors such as capacitor 27 produce a certain amount of capacitance for each unit of gate surface area. If the lateral dimensions (length and width) of gate structure 31 are large, gate structure 31 will consume a large amount of real estate on the surface 33 of the integrated circuit. As a result, the capacitance of the capacitor formed with such a gate structure will also be large. Capacitance also scales with oxide thickness. If oxide 29 is thin, the capacitance per unit of surface area will be high, whereas capacitance per unit of surface area will be low if oxide 29 is thick.

On a typical integrated circuit such as programmable logic device 10, digital logic circuitry near the center of the integrated circuit is powered using a low power supply voltage. The central portion of the integrated circuit that is powered with the low power supply voltage is sometimes referred to as the "core" and the power supply voltage used to power the core is sometimes referred to as the core power supply level. The use of a low power supply voltage in the core of the integrated circuit reduces power consumption, while providing sufficient power for acceptable device performance. A typical core power supply voltage is 1.0 volts. Larger or smaller core power supply voltages may be used if desired. The size of the core power supply voltage is expected to decrease in the future as permitted by improvements in process technology. The voltage of a core or low-power power supply is sometimes referred to as Vcc.

Near the periphery of the integrated circuit, input-output drivers are used to interface with external signal paths. Such input-output drivers are typically powered using an elevated voltage. This allows the input-output drivers to drive high-speed signals over paths such as noisy busses, without experiencing unacceptable signal degradation. An elevated ("input-output") power supply voltage is used to power the input-output drivers. With one suitable arrangement, the input-output power supply voltage is 2.5 volts. Larger or smaller input-output power supply voltages may be used if desired (e.g., as process technology evolves). The voltage of an elevated or input-output supply is sometimes referred to as Vccr.

Some integrated circuits contain more power supply voltages (e.g., intermediate power supply voltage levels that lie between the core power supply voltage level and the elevated input-output power supply voltage level).

During device fabrication, transistors and transistor-based capacitors of different oxide thicknesses are typically formed. Transistors that operate in the core of an integrated circuit are provided with the thinnest oxides and are sometimes referred to as "thin oxide" devices. Transistors that operate in the input-output circuitry of the device are provided with slightly thicker oxides and are sometimes referred to as "thick oxide" devices. The thicknesses of the thin and thick oxides are process dependent.

Thin oxide devices are used in the core logic because they exhibit the best performance when powered using the core power supply voltage Vcc. Thick oxide devices are used in the input-output circuitry. These devices are able to withstand the larger power supply voltage Vccr that is used in the periphery of the integrated circuit.

When designing circuits that contain capacitors, a circuit designer must ensure that the capacitors are not damaged by high voltages. As a result, capacitors that are subjected to voltages of more than Vcc are generally formed using thick oxides, even though these devices have reduced capacitance per unit area and therefore increase real estate consumption.

Power-supply generation circuitry may be used to produce on-chip power supply voltages that differ from the voltages that are provided to an integrated circuit through power supply pins. In a typical arrangement, power supply pins are used to receive voltages such as a low-power positive power supply voltage Vcc (e.g., 1.0 volts), an elevated positive power supply voltage Vccr (e.g., 2.5 volts), and a ground power supply voltage Vss (e.g., 0 volts). If a given circuit design needs additional power supply levels (e.g., to bias transistor body terminals, to generate programming voltages for programming electrically-programmable elements 20, etc.), the power-supply generation circuitry is configured to produce the desired additional power supply voltages. One suitable architecture for a power-supply generation circuit uses charge pump circuitry.

Figure 7:
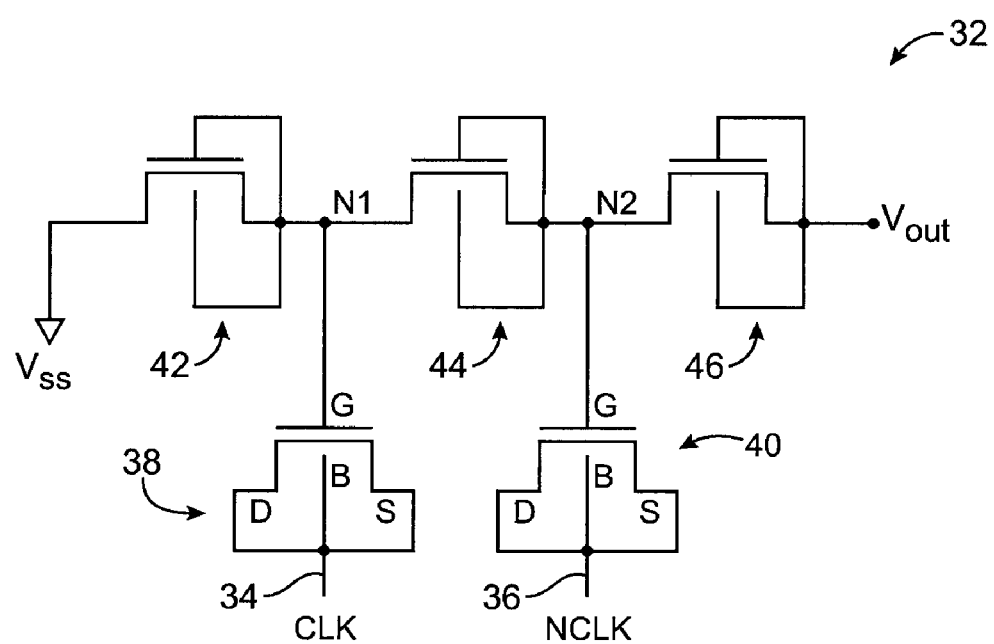
FIG. 7 is a diagram of an illustrative charge pump circuit that may be used on an integrated circuit such as a programmable logic device integrated circuit in accordance with the present invention.

An illustrative charge pump circuit 32 is shown in FIG. 7. A charge pump 32 of the type shown in FIG. 7 can be used to generate a voltage Vout that is negative with respect to Vss (i.e., a voltage that is less than 0 volts). The charge pump 32 that is shown in the example of FIG. 7 is a two-stage pump. This is merely illustrative. Charge pumps may have any suitable number of stages (e.g., one stage, two stages, three or more stages, etc.).

As shown in FIG. 7, clock signal CLK and its inverse NCLK, are applied to terminals 34 and 36 respectively. Capacitors 38 and 40 are metal-oxide-semiconductor transistor capacitors that are formed from metal-oxide-semiconductor transistor structures as described in connection with FIGS. 2, 3, 4, 5, and 6. The capacitor dielectrics in capacitors 38 and 40 are formed from gate oxides 29 (FIG. 6). Any suitable oxide thickness may be used in capacitors such as capacitors 38 and 40. With one suitable approach, capacitors 38 and 40 are thick oxide devices, so that relatively large clock signals CLK and NCLK may be applied.

One electrode of each capacitor is formed from a transistor gate terminal. The other electrode of each capacitor is formed from the drain, source, and body terminals, which are electrically connected, as shown in FIGS. 3 and 4. The use of metal-oxide-semiconductor capacitors in charge pump 32 is advantageous, because metal-oxide-semiconductor capacitors are readily available on device 10 and do not require special processing steps during the semiconductor manufacturing process.

Charge pump 32 has three transistors with terminals that are connected to form diodes 42, 44, and 46. Other diode structures may be used to form diodes 42, 44, and 46 if desired. A circuit diagram for the charge pump 32 of FIG. 7 in which diodes 42, 44, and 46 are represented using diode symbols and in which metal-oxide-semiconductor transistor capacitors 38 and 40 are represented using capacitor symbols is shown in FIG. 8.

Figure 8:
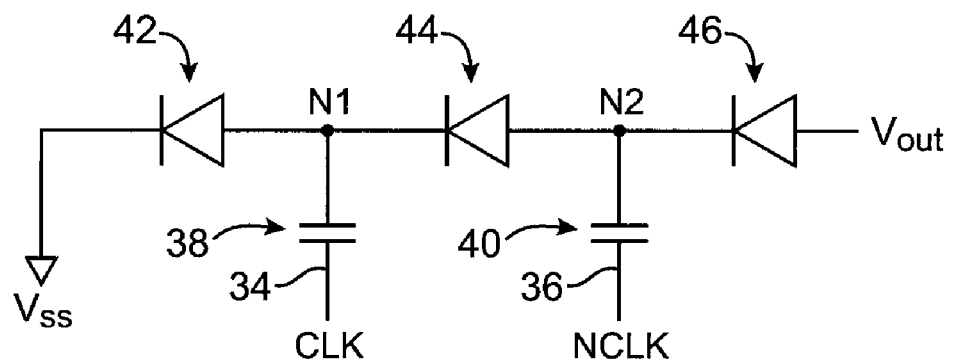
FIG. 8 is a diagram of an illustrative negative charge pump in accordance with the present invention.
Figure 9:
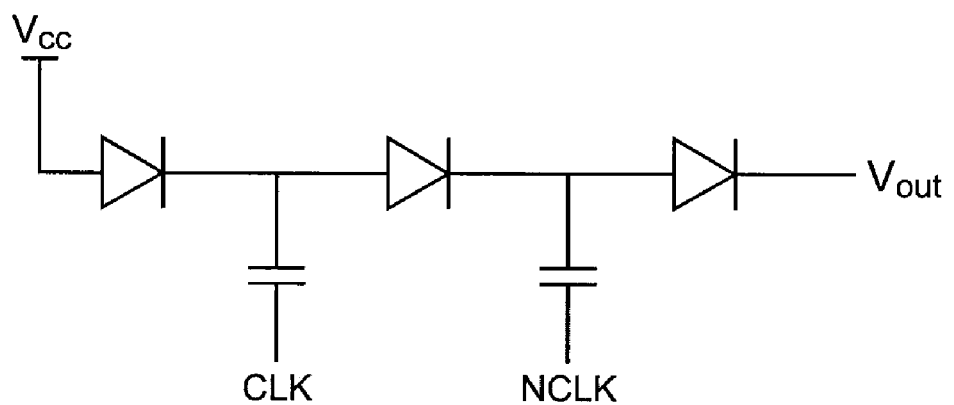
FIG. 9 is a diagram of an illustrative positive charge pump in accordance with the present invention.

Charge pumps of the type shown in FIG. 8 produce output voltages Vout that are less than ground voltage Vss (e.g., 0 volts) and are therefore sometimes referred to as negative charge pumps. Charge pumps of the type shown in FIG. 9 produce output voltages Vout that are positive and are therefore sometimes referred to as positive charge pumps. Both negative and positive charge pumps may be used on an integrated circuit such as programmable logic device integrated circuit 10 of FIG. 1.

Figure 10:
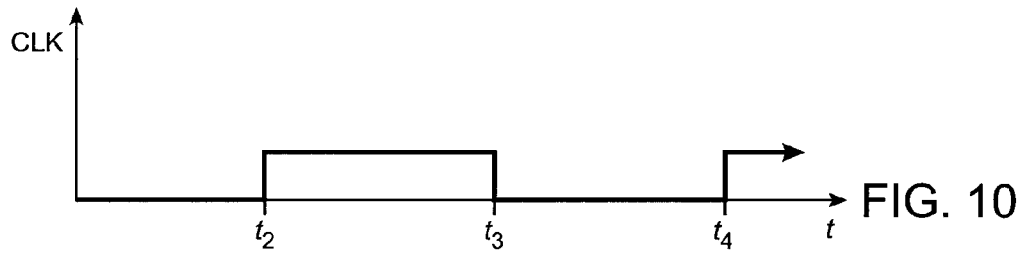
FIGS. 10, 11, 12, 13, and 14 are timing diagrams showing how a charge pump of the type shown in FIGS. 7 and 8 generates negative output voltages in accordance with the present invention.
Figure 11:
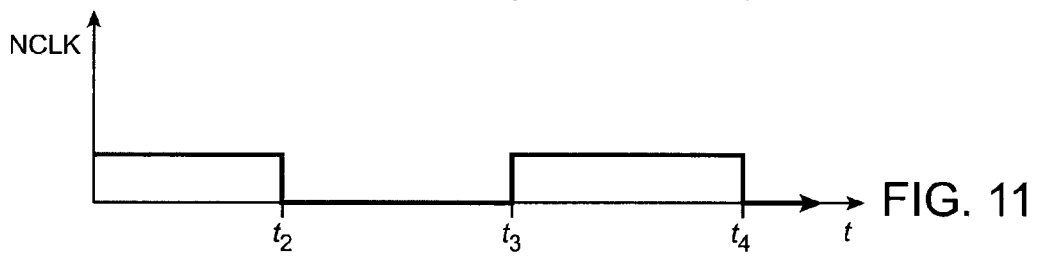
Figure 12:
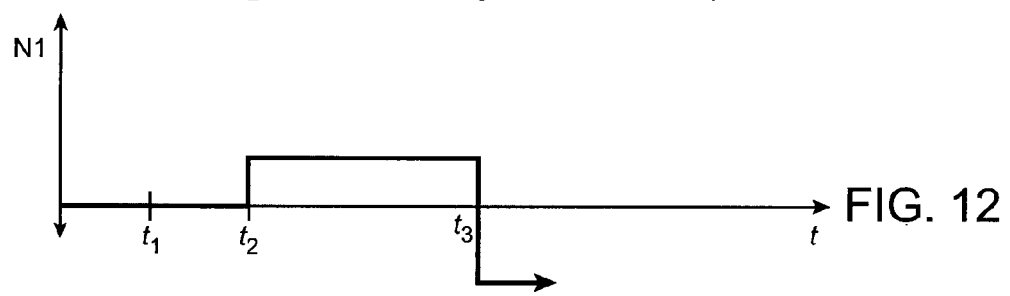
Figure 13:
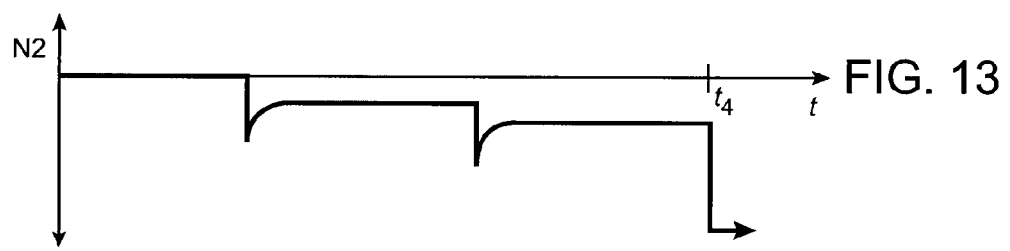
Figure 14:
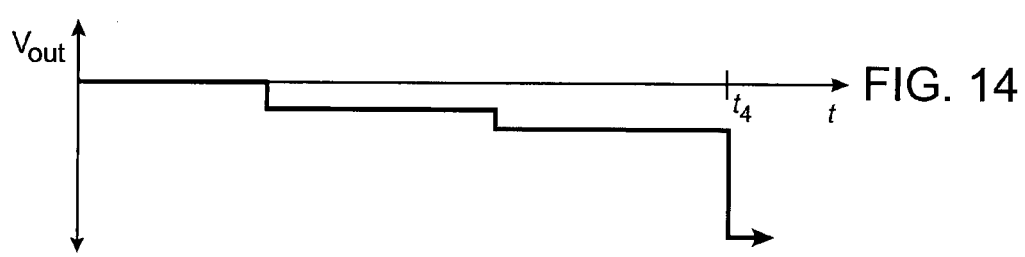

The operation of charge pump 32 of FIG. 8 is shown in the timing diagrams of FIGS. 10, 11, 12, 13, and 14. The clock signals CLK and NCLK are shown in FIGS. 10 and 11, respectively. The voltage on node N1 is shown in FIG. 12. The voltage on node N2 is shown in FIG. 13. The charge pump output voltage Vout is shown in FIG. 14.

Initially, at time $t_1$, the voltage on node N1 of charge pump 32 is at 0 volts, as shown in FIG. 12. At time $t_2$, the clock signal CLK goes high and its inverse NCLK goes low. During the rise in the signal CLK at time $t_2$, the voltage on line 34 goes high. As a result, the voltage at node N1 rises at time $t_2$. The rise in the voltage at node N1 turns on diode 42. The maximum rise in the voltage at node N1 is capped at the turn-on voltage of diode 42 (about 0.6 volts or one transistor threshold voltage Vt), which is less than the magnitude of CLK. Clock signal NCLK goes low at time $t_2$, which causes node N2 to go low, as shown in FIG. 13. Diode 44 is reverse biased, so there is no contention between the voltages at nodes N1 and N2.

At time $t_3$, the signal CLK goes low and the signal NCLK goes high. The drop in signal CLK causes the voltage on node N1 to drop, as shown in FIG. 12. At the same time, clock signal NCLK goes high. The voltage at node N2 rises to one diode turn-on voltage (about 0.6 volts or one transistor threshold voltage Vt) higher than the voltage at node N1, because diode 44 is turned on.

At time $t_4$, the signal CLK goes high and the signal NCLK goes low. The voltage across capacitor 40 does not change during the transitions at time $t_4$, so as shown in FIG. 13 the voltage at node N2 drops at time $t_4$, tracking the drop in the NCLK signal on terminal 36. This forces the voltage Vout on the output terminal of charge pump 32 low, as shown in FIG. 14. The voltage Vout is one diode turn-on voltage higher than the voltage at N2, because diode 46 is turned on.

As this discussion illustrates, the charge pump 32 produces a negative voltage Vout at its output.

The number of stages in the charge pump and the sizes of the clock signals affect the size of the negative output voltage Vout. For a given number of stages, the size of the output voltage Vout can be increased by increasing the size of CLK and NCLK. For a given required output voltage Vout, it is generally desirable to increase the size of CLK and NCLK as much as possible, as this permits the number of stages in the charge pump to be minimized, thereby minimizing real estate consumption on the integrated circuit.

Figure 15:
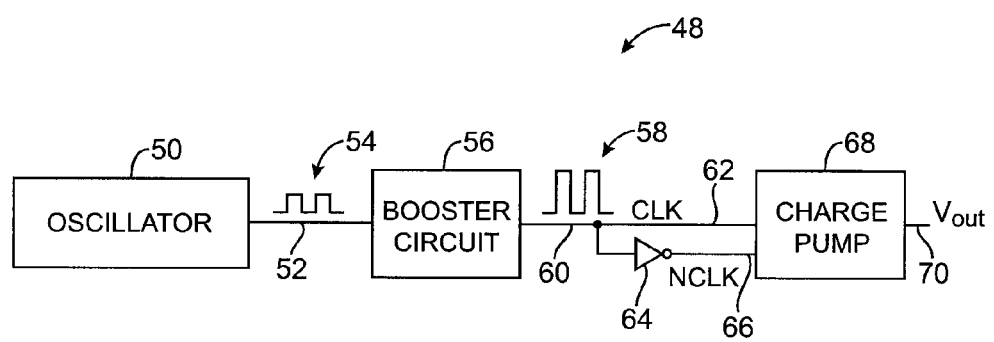
FIG. 15 is a circuit diagram showing how a booster circuit can increase the size of a digital signal such as a charge pump clock signal on a programmable logic device integrated circuit in accordance with the present invention.

To increase the size of CLK and NCLK, circuitry of the type shown in FIG. 15 may be used on the integrated circuit. Circuitry 48 includes an oscillator 50. Oscillator 50 may be any suitable circuitry for generating an oscillating digital signal. With one suitable arrangement, oscillator 50 generates a high-frequency square-wave signal 54 of about 50 MHz. Oscillator 50 may produce other suitable frequencies and waveforms if desired.

Oscillator 50 can be implemented using core logic. If oscillator 50 is implemented using core logic, the voltage of signal 54 will have a peak-to-peak swing of Vcc-Vss (e.g., 1.0 volts), as the signal 54 ranges from Vss to Vcc (e.g., from 0 volts to 1.0 volts). Booster circuit 56 receives the output of oscillator 50 on line 52 and produces a corresponding boosted output signal 58 on line 60.

Booster circuit 56 may be powered with any suitable power supply voltage. With one suitable arrangement, booster circuit 56 is powered using Vss and Vccr, so the output signal 58 ranges from Vss to Vccr (e.g., from 0 to 2.5 volts) and exhibits a peak-to-peak voltage swing of Vccr-Vss.

The boosted signal 58 is provided to charge pump 68 as clock signal CLK on line 62. Inverter 64 inverts the signal CLK to produce inverted clock signal NCLK. Inverter 64 is preferably powered using the same power supply voltage as booster circuitry 56 (e.g., Vccr), so that inverted clock NCLK ranges in voltage from Vss to Vccr, 1800 out-of-phase with respect to CLK. The inverted clock NCLK is provided to charge pump 68 using line 66. Charge pump 68 uses the signals CLK and NCLK to produce a desired output voltage Vout. The magnitude of Vout is determined by the frequency of oscillator 50, the sizes of the components in charge pump 68, the number of stages in the charge pump, and the size of the clock signals produced by booster circuit 56.

Figure 16:
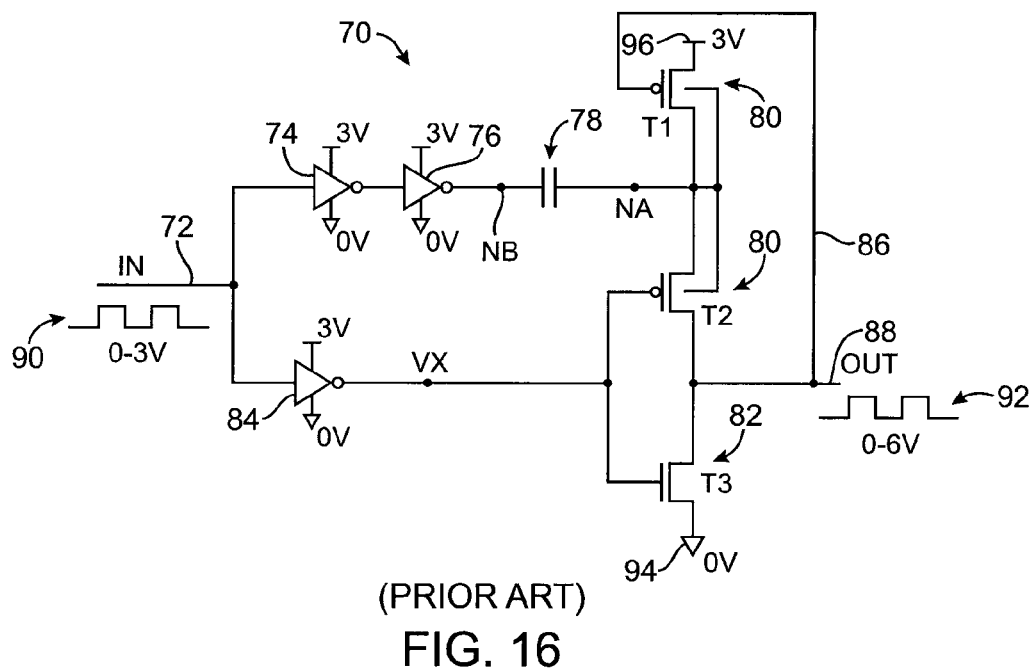
FIG. 16 is a circuit diagram of a conventional booster circuit.
Figure 17:
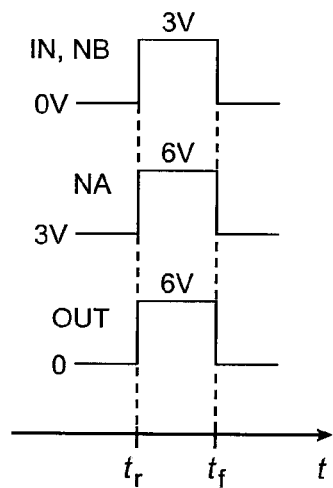
FIG. 17 is a timing diagram showing how the conventional booster circuit of FIG. 16 operates.

A conventional booster circuit 70 is shown in FIG. 16. A timing diagram of the signals in circuit 70 is shown in FIG. 17. As shown in FIG. 16, an input signal 90 that ranges from 0 volts to 3 volts is provided to input line 72. A corresponding boosted output signal 92 that ranges from 0 volts to 6 volts is provided at output line 88.

Booster circuit 70 has inverters 74, 76, and 84, capacitor 78, n-channel metal-oxide-semiconductor transistor 82, and p-channel metal-oxide-semiconductor transistors 80. As shown in FIG. 17, input signal IN rises at time $t_r$ and falls at time $t_f$.

Initially, at times just before $t_r$, when signal IN is at 0 volts, the voltage on node NA is 3 volts and the voltage on node NB is 0 volts. When signal IN rises to 3 volts at time $t_r$, the voltage on node NB rises to 3 volts. The voltage across capacitor 78 cannot change instantaneously, so the voltage on node NA also rises 3 volts to 6 volts, as shown in FIG. 17. With signal IN at 3 volts, the output of inverter 84 at node VX falls to 0 volts. With node VX at 0 volts, the gate of transistor T2 is at 0 volts. This turns on transistor T2 and connects output line 88 to node NA. The voltage on node NA at time $t_r$ is 6 volts, so the signal OUT on line 88 rises to 6 volts at time $t_r$.

When signal IN falls from 3 volts to 0 volts at time $t_f$, inverter 84 takes node VX to 3 volts. This takes the gate of transistor T3 to 3 volts and turns on transistor T3. With transistor T3 on, the output line 88 is electrically connected to 0 volts at terminal 94, so signal OUT on line 88 goes to 0 volts, as shown in FIG. 17. Line 86 conveys the zero-volt signal OUT to the gate of transistor T1, which turns transistor T1 on. With T1 on, node NA is electrically connected to terminal 96. This causes the voltage of node NA to fall to 3 volts at time $t_f$, as shown in FIG. 17.

Capacitor 78 is formed from a metal-oxide-semiconductor transistor structure. With the conventional design of booster 70, the capacitor 78 experiences voltage drops NA-NB equal to 3 volts. A voltage drop of 3 volts will damage thin oxide capacitors, so capacitor 78 must be fabricated as a thick-oxide device. Thick-oxide devices exhibit low capacitances per unit area, so capacitor 78 must be constructed with a large surface area to ensure that the capacitance of capacitor 78 is sufficient to meet the booster's current-handling specifications.

Figure 18:
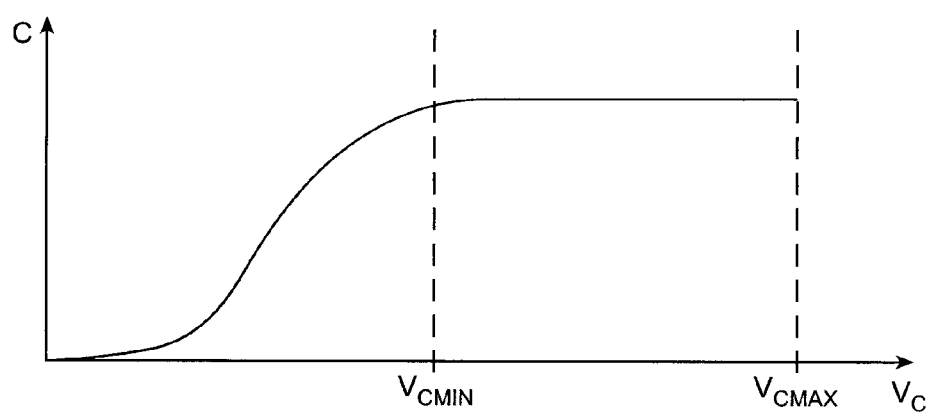
FIG. 18 is a diagram showing how the capacitance of metal-oxide-semiconductor transistor capacitors varies as a function of applied voltage.

Metal-oxide-semiconductor capacitors such as capacitor 78 typically exhibit a capacitance C that has a dependence on applied voltage V of the type shown in FIG. 18. The capacitor functions normally in the voltage range between Vcmin and Vcmax. In this regime, a booster that contains the capacitor will behave predictably. At voltages greater than Vcmax, the capacitor will be damaged due to excessively large voltages applied across its gate oxide. At voltages less than Vcmin, the capacitance C varies significantly which makes reliable and well-controlled circuit operation difficult or impossible.

Figure 19:
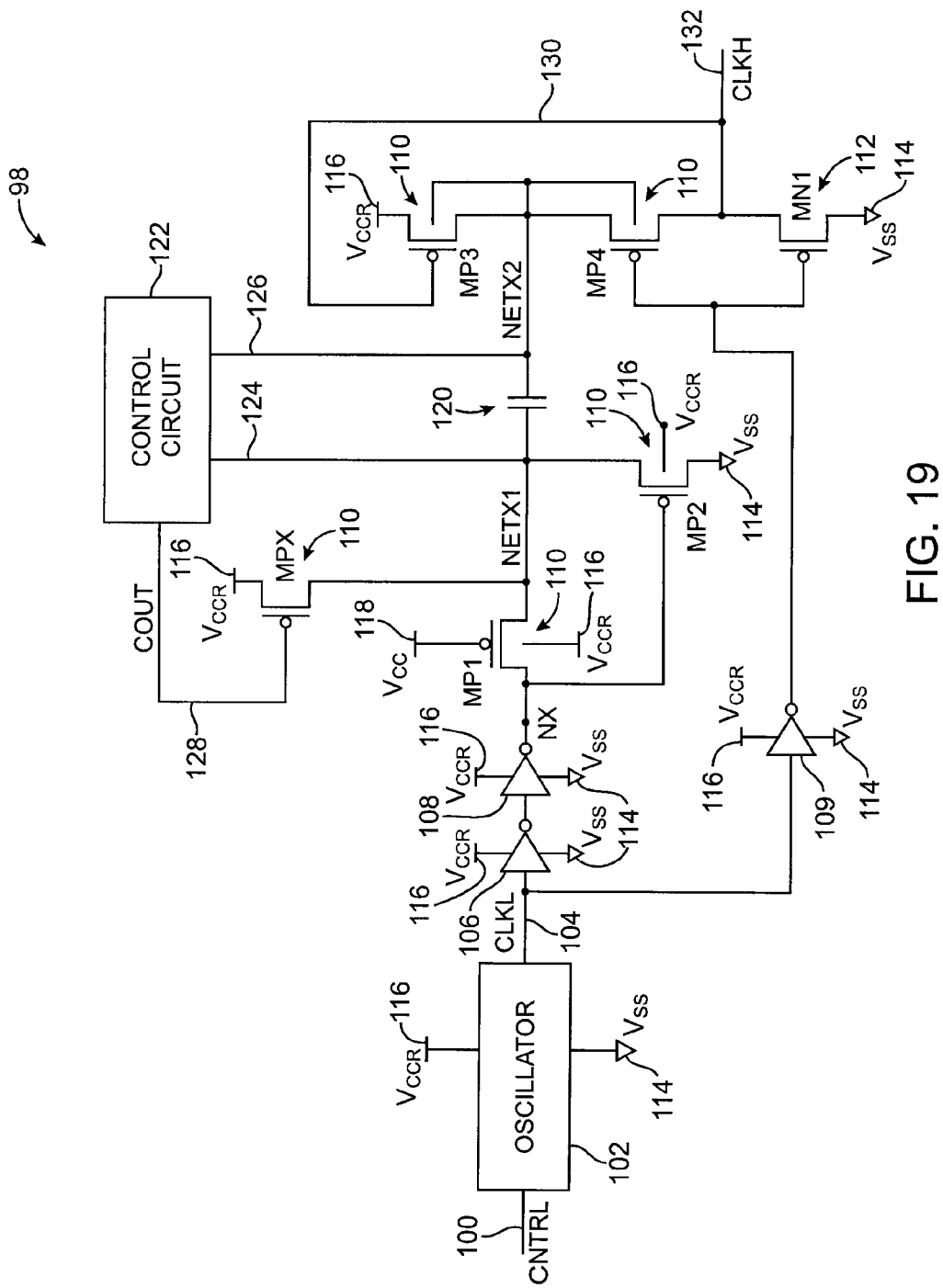
FIG. 19 is a circuit diagram of an illustrative oscillator and booster circuit in accordance with the present invention.
Figure 20:
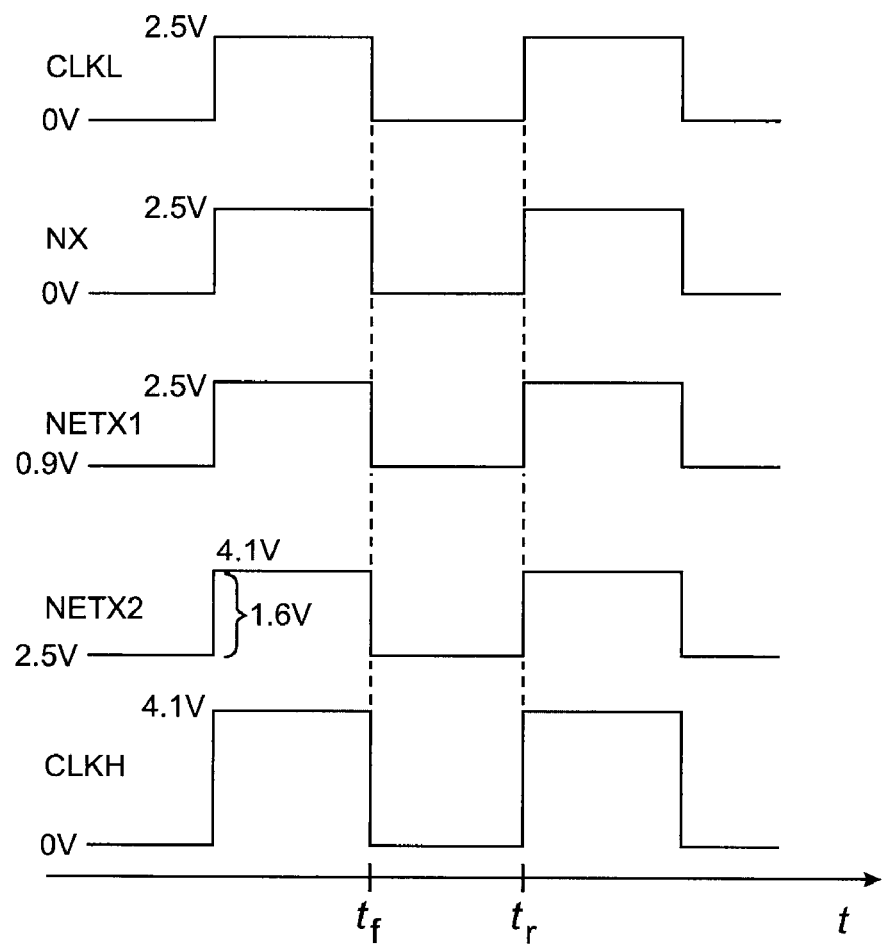
FIG. 20 is a timing diagram showing how the booster circuitry of FIG. 19 is used to increase the voltage of a digital signal such as a clock signal in accordance with the present invention.

A booster 98 in accordance with the present invention is shown in FIG. 19. Signal traces illustrating the operation of booster 98 when boosting a digital input signal CLKL to form a boosted output signal CLKH are shown in FIG. 20. Signal CLKH and its inverse NCLKH can be used as charge pump clocks CLK and NCLK, as described in connection with FIG. 15.

In the example of FIG. 19, booster circuit 98 is powered using ground voltage Vss at terminals 114, low-voltage positive power supply voltage Vcc at terminal 118, and elevated positive power supply voltage Vccr at terminals 116. For this example, the value of Vss is assumed to be 0 volts, Vcc is taken to be 1.0 volts, and Vccr is taken to be 2.5 volts. These are merely illustrative power supply voltage levels. Any suitable power supply voltage levels may be used to power booster circuit 98 if desired.

Unboosted clock signal CLKL is generated by oscillator 102. Oscillator 102 is controlled by control signal CNTRL on line 100. The signal CNTRL can be used to turn oscillator 102 on or off. When oscillator 102 is not needed, it is preferably turned off to reduce power consumption. The signal CNTRL may be generated by user logic implemented in programmable logic 18 of device 10 or any other suitable control circuitry on the integrated circuit in which booster circuit 98 is used. Because oscillator 102 can be turned on and off, booster circuit 98 has two modes of operation. When oscillator 102 is active, booster circuit 98 operates in an oscillator-on mode. When oscillator 102 is inactive, booster circuit 98 operates in an oscillator-off mode.

The clock signal CLKL is provided to booster circuit input line 104. Booster circuit 98 increases the peak-to-peak voltage of the signal CLKL and produces a corresponding boosted output signal CLKH on line 132.

Booster circuit 98 contains inverters 106, 108, and 109, p-channel metal-oxide-semiconductor transistors 110, n-channel metal-oxide-semiconductor transistor 112, capacitor 120, and control circuit 122. To minimize the circuit real estate consumed by booster circuit 98, capacitor 120 is preferably formed from a metal-oxide-semiconductor transistor structure with a thin oxide. Because thin oxide devices are more susceptible to damage from high voltages than thick oxide devices, the booster circuit 98 contains capacitor protection circuitry that prevents the voltage across capacitor 120 from becoming too large.

Transistors MP1 and MP2 protect booster circuit 98 during oscillator-on mode. The voltage across capacitor 120 is given by the voltage difference between nodes NETX2 and NETX1 (i.e., NETX2–NETX1). The transistors MP1 and MP2 are sized so that in operation, with oscillator 102 on, node NETX1 discharges to a predetermined voltage. This maintains the voltage of node NETX1 at a safe level and prevents damage to capacitor 120.

Consider a high-to-low transition of input signal CLKL. As shown in FIG. 20, at times just before time $t_f$, the signal CLKL is high at 2.5 volts (in this example). Due to the two inversions of inverters 106 and 108, the voltage at NX at this time is also 2.5 volts. With Vcc (1.0 volts) on the gate of transistor MP1, Vccr (2.5 volts) on the body of transistor MP1, and NX at 2.5 volts, the gate-source voltage Vgs of transistor MP1 is less than zero and transistor MP1 is on. With transistor MP1 on, the voltage of node NETX1 is at 2.5 volts, as shown at times just before $t_f$ in FIG. 20.

At time $t_f$, the signal CLKL falls from 2.5 volts to 0 volts, causing the signal at node NX to fall to 0 volts. The voltage at NETX1 therefore falls to Vcc (1.0 volts) plus one transistor threshold voltage Vt (0.6 volts). With NETX1 at 1.6 volts, transistor MP1 is at the threshold of turning off, so NETX1 is floating at Vcc+Vt (1.6 volts). As the voltage on node NX drops a threshold voltage Vt below NETX1 (on the high-low transition of CLKL at time $t_f$), transistor MP2 (which was fully off) starts to partially turn on, because NETX1−NX becomes greater than the threshold voltage Vt of transistor MP2. As a result, transistor MP2 starts to slowly discharge node NETX1 to a predetermined level of 0.9 volts.

As shown in FIG. 20, the value of NETX2 varies between a low of 2.5 volts and a high of 4.1 volts. The 2.5 volt minimum of NETX2 is obtained when CLKL is low, which turns transistor MN1 on and pulls CLKH low, turning transistor MP3 on and connecting node NETX2 to Vccr. The 4.1 volt maximum voltage of NETX2 is achieved when NETX1 makes its 1.6 volt transition from 0.9 volts (its discharged low) to 2.5 volts. Because the voltage across capacitor 120 cannot change instantaneously, the 1.6 voltage step in NETX1 is passed to NETX2, causing NETX2 to rise from 2.5 volts to 4.1 volts. The signal CLKL is high while NETX2 is at 4.1 volts, so transistor MP4 is on and CLKH is at 4.1 volts, as shown in FIG. 20.

With this arrangement, which relies on proper transistor sizing, the voltage across capacitor 120 is well controlled and capacitor 120 is not stressed. During the design and fabrication process, transistor MP2 is sized so that CLKL will rise at time $t_r$ just as NETX1 has been discharged to 0.9 volts. This transistor sizing process relies on information on the operating frequency of oscillator 102 (50 MHz in this example). Increasing the size (e.g., the gate width) of transistor MP2 would increase the discharge rate and would result in a predetermined discharge voltage on node NETX1 at time $t_r$ that is less than 0.9 volts, whereas decreasing the gate width of MP2 would result in a discharge voltage on node NETX1 at time $t_r$ that is greater than 0.9 volts. Proper transistor sizing ensures that the voltage at node NETX1 does not discharge too much before time $t_r$ (i.e., below 0.9 volts) and therefore ensures that the voltage across capacitor 120 will not become too large (i.e., above 1.6 volts). This allows capacitor 120 to be fabricated from a thin oxide device. Controlling the voltage on node NETX1 also ensures that the voltage across the capacitor 120 does not become too small, which would lead to operation below the capacitor's Vcmin point, as described in connection with FIG. 18.

The capacitor 120 is also protected when the booster 98 is operated in oscillator-off mode. Control circuit 122 monitors the voltage across capacitor 120 using lines 124 and 126. During oscillator-off mode, control circuit 122 generates a low control signal COUT on line 128 whenever the voltage across the capacitor 120 becomes too large. The low COUT signal turns on transistor MPX and pulls node NETX1 towards Vccr. This reduces the voltage drop that is across capacitor 120. By preventing node NETX1 from drifting too low during oscillator-off mode, control circuit 122 and transistor MPX protect capacitor 120 from damage.

During oscillator-off mode, the signal CLKL is at Vss. With CLKL at 0 volts, the voltage at node NX is at 0 volts and the gate of transistor MP2 is low. Transistor MP2 is a p-channel metal-oxide-semiconductor transistor. When the gate of MP2 is low, transistor MP2 turns on. Turning MP2 on pulls node NETX1 down towards one transistor threshold voltage Vt (about 0.6 volts) above Vss (0 volts). The voltage on node NETX1 cannot fall lower because a lower voltage would turn transistor MP2 off. Because CLKL is low, the output of inverter 109 is high. The high output of inverter 109 turns transistor MN1 on and pulls CLKH to 0 volts. With CLKH at 0 volts, transistor MP3 is turned on. This electrically connects node NETX2 to Vccr and takes node NETX2 to 2.5 volts.

The voltage across the capacitor 120 is given by the difference between the voltage at NETX2 and the voltage at node NETX1. Without the monitoring and control functions of control circuit 122, this difference will be 1.9 volts (2.5 volts–0.6 volts). In the present example, capacitor 120 is a thin oxide device that will be damaged by voltages of over 1.8 volts. Accordingly, unless control circuit 122 is used to prevent the voltage across capacitor 120 from exceeding 1.8 volts, capacitor 120 will be damaged.

Figure 21:
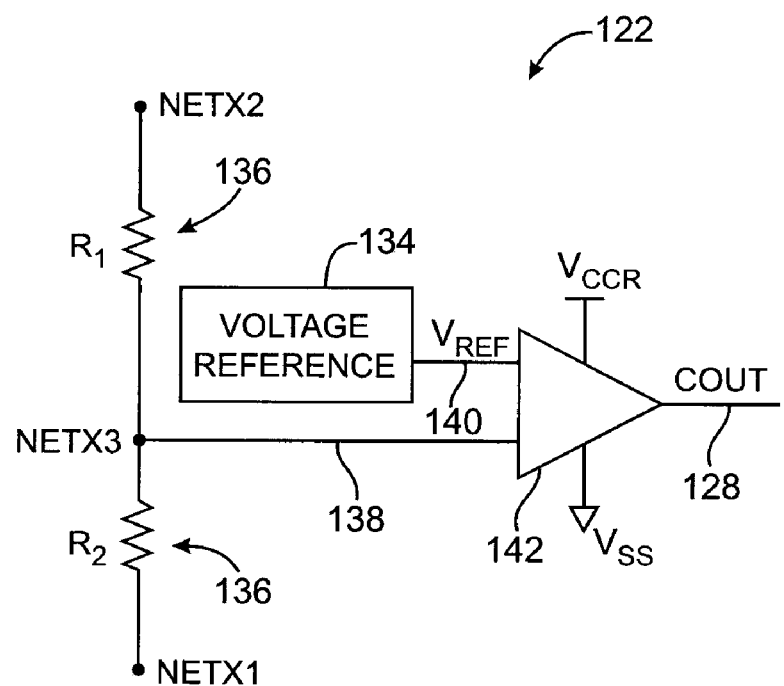
FIG. 21 is a circuit diagram of an illustrative control circuit for monitoring booster circuit capacitor voltage and controlling a discharge transistor in accordance with the present invention.

An illustrative control circuit 122 is shown in FIG. 21. Control circuit 122 has a voltage divider formed from resistors 136. The voltage divider produces a voltage at node NETX3 from the voltages at nodes NETX1 and NETX2. The voltage at node NETX3 is provided to the input of comparator 142 via line 138. Comparator 142 receives a reference voltage Vref from voltage reference 134 on line 140. Any suitable type of reference voltage source may be used to generate voltage Vref. With one particularly suitable arrangement, voltage reference 134 is formed from a bandgap reference circuit.

Comparator 142 compares the voltage Vref that is received on input 140 to the voltage NETX3 received on input 138 and provides a corresponding output signal COUT on line 128. As shown in FIG. 19, the output signal COUT serves as a control signal for transistor MPX and regulates the voltage on node NETX1.

Resistors 136 may be formed from unsilicided polysilicon resistor structures or any other suitable resistor structures. The values of resistors R1 and R2 are chosen to set an appropriate trip point for the comparator. As an example, if Vref is equal to 1.0 volts, the values of R1 and R2 may be selected such that when NETX2−NETX1 is equal to 1.8 volts the voltage on NETX3 will be 1.0 volts. Whenever NETX1 drifts low enough that NETX2−NETX1 is greater than the maximum desired operating voltage for the capacitor 120 (1.8 volts in this example), NETX3 will fall below Vref (1.0 volts in this example). This causes comparator 142 to generate a low (0 volt) output signal COUT, which turns on transistor MPX (FIG. 19) and pulls NETX1 up towards a higher voltage. By ensuring that the voltage on NETX1 does not drift too low during oscillator off mode, the voltage across capacitor 120 is prevented from becoming too high, so capacitor 120 is not overly stressed. When NETX1 rises sufficiently, the voltage NETX3 will rise above Vref and the comparator 142 will take COUT high, turning MPX off.

The control circuit 122 of FIG. 21 regulates the voltage on node NETX1 to prevent the voltage across capacitor 120 from becoming too high, so that booster 98 may be safely operated in oscillator-off mode.

If desired, hysteresis may be added to the control process to prevent control circuit 122 from cycling excessively. An illustrative control circuit 122 that includes circuitry for inducing hysteresis in the control process is shown in FIG. 22.

Figure 22:
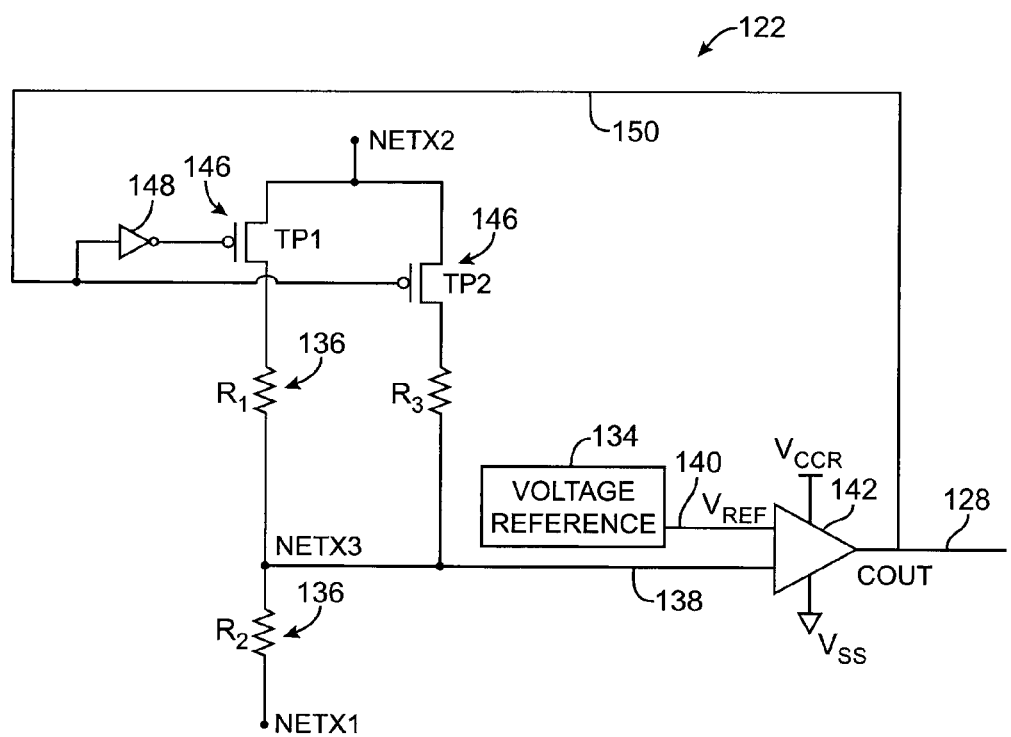
FIG. 22 is a circuit diagram of an illustrative booster circuit capacitor monitoring and control circuit having a hysteresis circuit based on p-channel metal-oxide-semiconductor transistors in accordance with the present invention.

Control circuitry 122 of FIG. 22 has a feedback path 150 that supplies a feedback signal from the output of comparator 142 to the gates of transistors 146. Transistor TP2 has a gate that receives the feedback signal directly from line 150. Inverter 148 inverts the feedback signal on line 150 and provides the inverted feedback signal to the gate of transistor TP1.

Resistor R3 and transistor TP2 operate in parallel with resistor R1 and transistor TP1. When the control signal COUT is low, transistor TP2 is turned on and transistor TP1 is turned off. In this situation, resistor R3 is switched into use and the voltage divider between NETX2 and NETX1 is formed from resistors R3 and R2. When the control signal COUT is high, transistor TP2 is turned off and transistor TP1 is turned on. This switches resistor R1 into use so that the voltage divider between NETX2 and NETX1 is formed from resistors R2 and R1, as described in connection with FIG. 21. The values of R1, R2, and R3 are chosen to provide two selectable voltage trip points. One trip point is established by the R1/R2 voltage divider. Another trip point is established by the R3/R2 voltage divider.

With one suitable arrangement, the R1/R2 voltage divider is configured so that NETX3 will be 1.0 volts when NETX2−NETX1 is equal to 1.8 volts and the R3/R2 voltage divider is configured so that NETX3 will be 1.0 volts when NETX2−NETX1 is equal to 1.6 volts. With this configuration, whenever NETX1 drifts low enough that NETX2−NETX1 is greater 1.8 volts, NETX3 will fall below 1.0 volts. This causes comparator 142 to generate a low (Vss) output signal COUT, which turns on transistor MPX (FIG. 19) and pulls NETX1 up towards a higher voltage and thereby protects the capacitor from stress due to overly-large voltages (i.e., voltages above the capacitor's desired maximum operating voltage Vcmax). The low output signal COUT also turns transistor TP2 on and transistor TP1 off, so that resistor R3 is switched into use in the voltage divider in place of resistor R1.

Turning MPX on causes the voltage on node NETX1 to rise and causes the voltage drop NETX2−NETX1 to fall. When NETX1 has risen enough to cause NETX2−NETX1 to fall below 1.6 volts, NETX3 will rise above 1.0 volts. When NETX3 rises above 1.0 volts, comparator 142 will generate a high (Vccr) output signal. The high output signal COUT turns off transistor MPX, so that the voltage NETX1 is not pulled too high and so that the voltage across the capacitor does not fall below its desired minimum operating voltage Vcmin.

The use of feedback to selectively configure which resistor pair is active in the voltage divider adds hysteresis so that toggling in signal COUT is reduced. This reduces power consumption in the control circuit 122. Any suitable voltage trip points may be used in the control circuit 122. In the example described in connection with FIG. 22, the upper voltage trip point was set to 1.8 volts and the lower voltage trip point was set to 1.6 volts. This ensures that transistor MPX is turned on whenever the capacitor voltage exceeds 1.8 volts and that transistor MPX is turned off whenever the capacitor voltage falls below 1.6 volts. If desired, other suitable trip points can be used, so long as the upper trip point corresponds to the desired maximum operating voltage for the capacitor ($\leq$Vcmax) and the lower trip point corresponds to the desired minimum operating voltage for the capacitor ($\geq$Vcmin).

Figure 23:
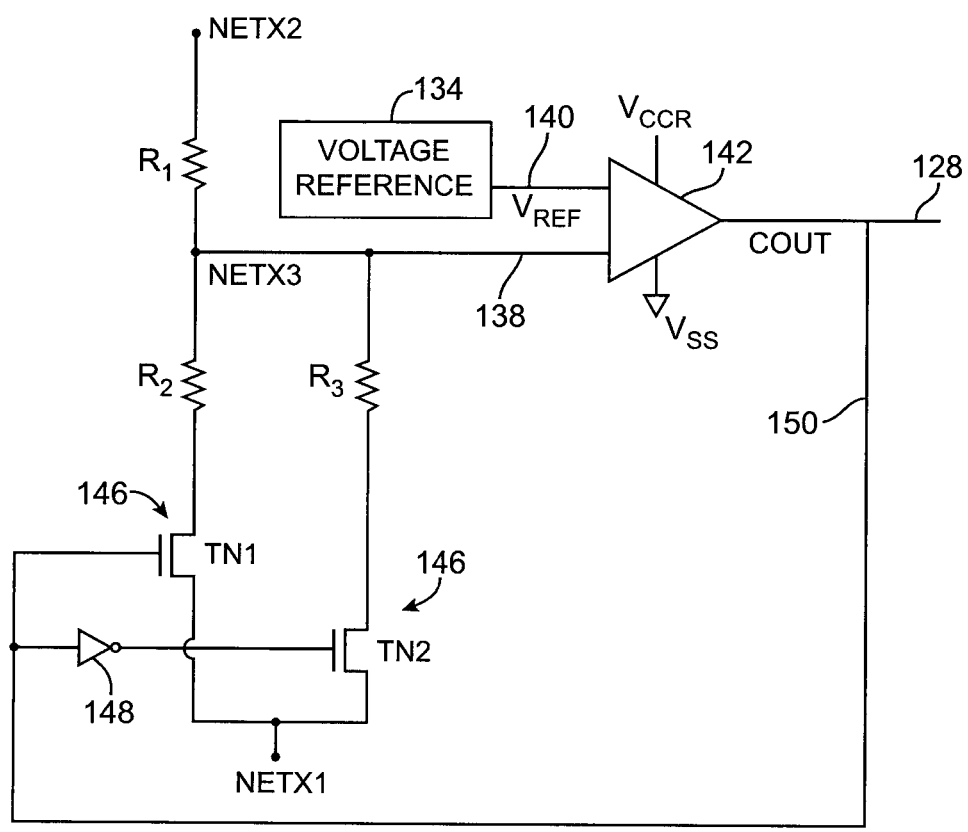
FIG. 23 is a circuit diagram of an illustrative booster circuit capacitor monitoring and control circuit having a hysteresis circuit based on n-channel metal-oxide-semiconductor transistors in accordance with the present invention.

The control circuit 122 of FIG. 22 was implemented using p-channel transistors 146. If desired, the control circuit 122 can be implemented using n-channel transistors. An illustrative control circuit 122 in which n-channel transistors TN1 and TN2 have been used in place of the p-channel transistors TP1 and TP2 of FIG. 22 is shown in FIG. 23. The control circuitry of FIGS. 21, 22, and 23 or any other suitable control circuitry may be used to protect the capacitor in booster circuit 98 of FIG. 19 from voltage overstress during oscillator-off operation.

Figure 24:
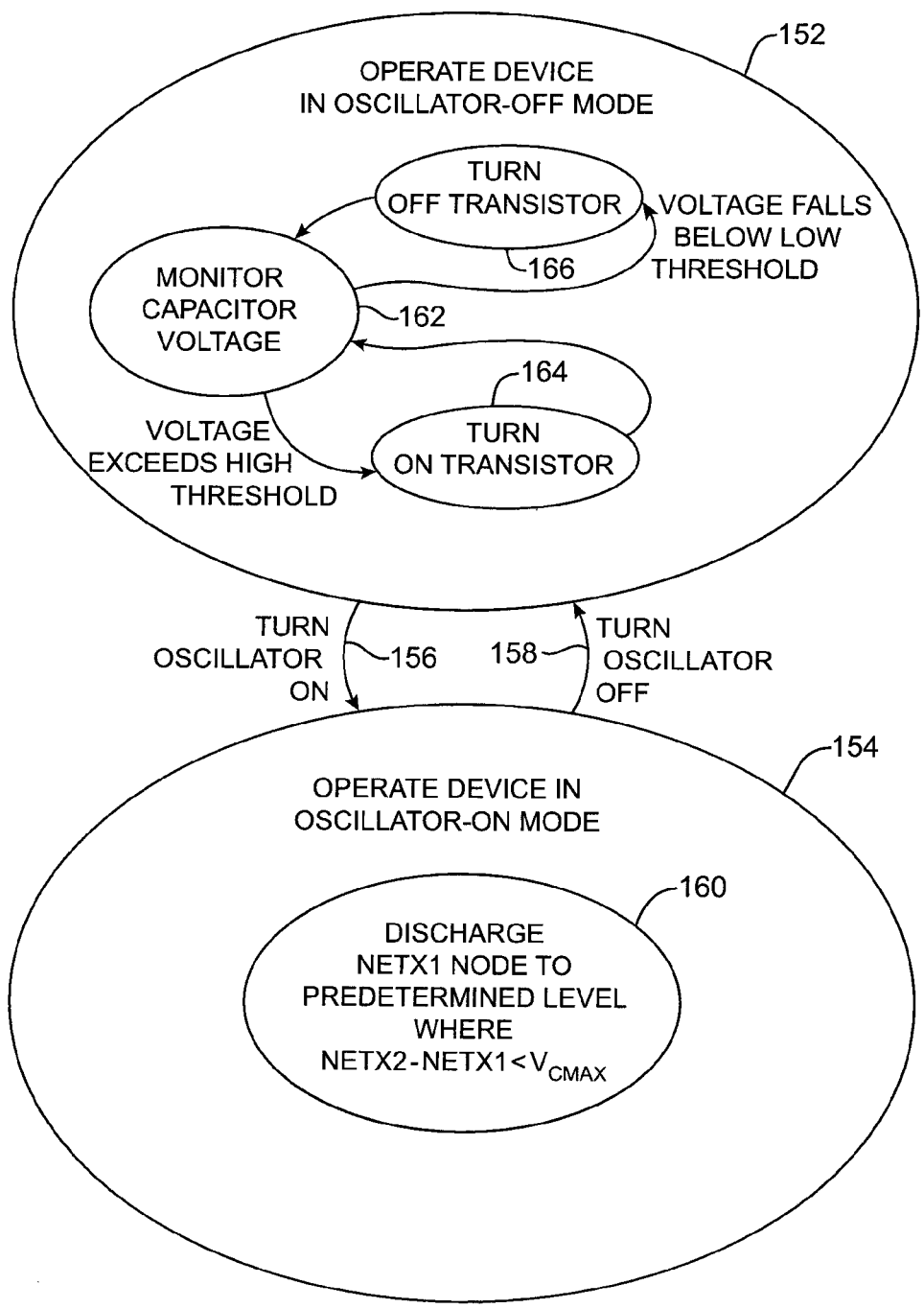
FIG. 24 is a state diagram showing the operation of the booster circuitry during different modes of circuit operation in accordance with the present invention.

A state diagram of the operation of the booster circuitry 98 of FIG. 19 in both the oscillator-on and oscillator-off operating modes is shown in FIG. 24. In state 152, the oscillator 102 is off. In state 154, the oscillator 102 is on. As indicated by line 158, when the oscillator 102 is turned off, the booster transitions from operating in the oscillator-on mode (state 154) to operating in the oscillator-off mode (state 152). As indicated by line 156, when the oscillator 102 is turned on, the booster transitions from operating in the oscillator-off mode (state 152) to operating in the oscillator-on mode (state 154).

The oscillator may be turned on and off using any suitable control scheme. For example, the oscillator may be turned off by a control signal CNTRL applied to control input line 100 (FIG. 19) that is generated by programmable logic 18 (FIG. 1) or other control circuitry on an integrated circuit in which the booster circuit 98 is implemented. With one suitable arrangement, the oscillator 102 may be turned off by signal CNTRL whenever the booster circuit 98 is not needed to save power. When the booster circuit 98 is needed, the CNTRL signal may be used to turn the oscillator on.

When the booster circuit 98 is operated in oscillator-on mode (state 154), the booster circuit 98 is active and boosts digital input signals that are applied to its input. As indicated by state 160, during oscillator-on mode, capacitor protection circuitry such as the circuitry based on transistor MP1 and transistor MP2 prevents the voltage on node NETX1 from falling below a predetermined level. This prevents the voltage across the capacitor from exceeding a desired maximum voltage. As described in connection with FIG. 19, the voltage across the capacitor is also prevented from becoming too small, so that the capacitor operates above a desired minimum voltage.

When the booster circuit 98 is operated in oscillator-off mode (state 152), control circuit 122 is used to prevent the voltage across the capacitor from becoming too large. In state 162, control circuit 122 monitors the voltage across capacitor 120. If the voltage across the capacitor exceeds a high threshold voltage, control circuit 122 generates a control signal that turns on transistor MPX (164) and thereby reduces the voltage across the capacitor. If the voltage across the capacitor falls below a low threshold voltage, control circuit 122 generates a control signal that turns off transistor MPX (166) and thereby increases the voltage across the capacitor. The high and low threshold voltages may be, for example, 1.8 volts and 1.6 volts, respectively, as described in connection with FIGS. 22 and 23. If desired, a single threshold voltage may be used (e.g., when a control circuit 122 of the type shown in FIG. 21 is used).

The foregoing is merely illustrative of the principles of this invention and various modifications can be made by those skilled in the art without departing from the scope and spirit of the invention.

What is claimed is:

1. A booster circuit comprising:
an input line at which a digital input signal is received;
an output line at which the booster circuit provides a corresponding boosted digital output signal;
a capacitor connected between a first node and a second node;
circuitry that discharges the first node to a predetermined value during operation of the booster circuit to prevent the voltage across the capacitor from rising beyond a desired maximum capacitor voltage; and
a control circuit that monitors voltage across the capacitor when the digital input signal is at a fixed voltage and that generates a corresponding control signal to prevent the voltage across the capacitor from rising beyond a desired maximum capacitor voltage.

2. The booster circuit defined in claim 1 wherein the circuitry comprises a first transistor having a source-drain connected to the first node.

3. The booster circuit defined in claim 1 wherein the circuitry comprises:
a first transistor having a first source-drain connected to the first node and a second source-drain connected to ground; and
a second transistor having a first source-drain connected to the first node and having a second source-drain coupled to the input line.

4. A booster circuit comprising:
an input line at which a digital input signal is received;
an output line at which the booster circuit provides a corresponding boosted digital output signal;
a capacitor connected between a first node and a second node;
circuitry that discharges the first node to a predetermined value during operation of the booster circuit to prevent the voltage across the capacitor from rising beyond a desired maximum capacitor voltage;
a control circuit that monitors voltage across the capacitor when the digital input signal is at a fixed voltage and that generates a corresponding control signal to prevent the voltage across the capacitor from rising beyond a desired maximum capacitor voltage; and
a first transistor having a first source-drain connected to the second node and a second source-drain connected to the output line, wherein the circuitry comprises:
a second transistor having a first source-drain connected to the first node and a second source-drain connected to ground; and
a third transistor having a first source-drain connected to the first node and having a second source-drain coupled to the input line.

5. A booster circuit comprising:
an input line at which a digital input signal is received;
an output line at which the booster circuit provides a corresponding boosted digital output signal;
a capacitor connected between a first node and a second node;
circuitry that discharges the first node to a predetermined value during operation of the booster circuit to prevent the voltage across the capacitor from rising beyond a desired maximum capacitor voltage;
a control circuit that monitors voltage across the capacitor when the digital input signal is at a fixed voltage and that generates a corresponding control signal to prevent the voltage across the capacitor from rising beyond a desired maximum capacitor voltage;

a first transistor having a first source-drain connected to the second node and a second source-drain connected to the output line;

a second transistor having a first source-drain connected to the second node, having a second source-drain connected to an elevated positive power supply line, and having a gate; and a conductive line connected between the output line and the gate of the second transistor, wherein the circuitry comprises:

a third transistor having a first source-drain connected to the first node and a second source-drain connected to ground; and a fourth transistor having a first source-drain connected to the first node and having a second source-drain coupled to the input line.

6. A booster circuit comprising:

an input line at which a digital input signal is received;

an output line at which the booster circuit provides a corresponding boosted digital output signal;

a capacitor connected between a first node and a second node;

circuitry that discharges the first node to a predetermined value during operation of the booster circuit to prevent the voltage across the capacitor from rising beyond a desired maximum capacitor voltage;

a first transistor connected between the first node and an elevated positive power supply line, wherein the first transistor has a gate;

a control circuit that monitors voltage across the capacitor when the digital input signal is at a fixed voltage and that generates a corresponding control signal, wherein the control signal is applied to the gate of the first transistor to prevent the voltage across the capacitor from rising beyond a desired maximum capacitor voltage;

a second transistor having a first source-drain connected to the second node and a second source-drain connected to the output line;

a third transistor having a first source-drain connected to the second node, having a second source-drain connected to the elevated positive power supply line, and having a gate; and a conductive line connected between the output line and the gate of the third transistor.

7. A booster circuit comprising:

an input line at which a digital input signal is received;

an output line at which the booster circuit provides a corresponding boosted digital output signal;

a capacitor connected between a first node and a second node;

circuitry that discharges the first node to a predetermined value during operation of the booster circuit to prevent the voltage across the capacitor from rising beyond a desired maximum capacitor voltage;

a first transistor connected between the first node and an elevated positive power supply line, wherein the first transistor has a gate;

a control circuit that monitors voltage across the capacitor when the digital input signal is at a fixed voltage and that generates a corresponding control signal, wherein the control signal is applied to the gate of the first transistor to prevent the voltage across the capacitor from rising beyond a desired maximum capacitor voltage;

a second transistor having a first source-drain connected to the second node and a second source-drain connected to the output line;

a third transistor having a first source-drain connected to the second node, having a second source-drain connected to an elevated positive power supply line, and having a gate; and a conductive line connected between the output line and the gate of the third transistor, wherein the circuitry comprises:

a fourth transistor having a first source-drain connected to the first node and a second source-drain connected to ground; and a fifth transistor having a first source-drain connected to the first node and having a second source-drain coupled to the input line.

8. A booster circuit comprising:

an input line at which a digital input signal is received;

an output line at which the booster circuit provides a corresponding boosted digital output signal;

a capacitor connected between a first node and a second node;

circuitry that discharges the first node to a predetermined value during operation of the booster circuit to prevent the voltage across the capacitor from rising beyond a desired maximum capacitor voltage;

a first transistor connected between the first node and an elevated positive power supply line, wherein the first transistor has a gate;

a control circuit that monitors voltage across the capacitor when the digital input signal is at a fixed voltage and that generates a corresponding control signal, wherein the control signal is applied to the gate of the first transistor to prevent the voltage across the capacitor from rising beyond a desired maximum capacitor voltage;

a second transistor having a first source-drain connected to the second node and a second source-drain connected to the output line;

a third transistor having a first source-drain connected to the second node, having a second source-drain connected to an elevated positive power supply line, and having a gate;

a fourth transistor having a first source-drain connected to ground, having a second source-drain terminal connected to the output line, and having a gate;

a conductive line connected between the output line and the gate of the third transistor, wherein the circuitry comprises a fifth transistor having a first source-drain connected to the first node and a second source-drain connected to ground and a sixth transistor having a first source-drain connected to the first node and having a second source-drain; and first and second inverters coupled between the second source-drain of the sixth transistor and the input line.

9. A booster circuit comprising:

an input line at which a digital input signal is received;

an output line at which the booster circuit provides a corresponding boosted digital output signal;

a capacitor connected between a first node and a second node;

circuitry that discharges the first node to a predetermined value during operation of the booster circuit to prevent the voltage across the capacitor from rising beyond a desired maximum capacitor voltage;

a first transistor connected between the first node and an elevated positive power supply line, wherein the first transistor has a gate;

a control circuit that monitors voltage across the capacitor when the digital input signal is at a fixed voltage and that generates a corresponding control signal, wherein the control signal is applied to the gate of the first transistor to prevent the voltage across the capacitor from rising beyond a desired maximum capacitor voltage;

a second transistor having a first source-drain connected to the second node and a second source-drain connected to the output line;

a third transistor having a first source-drain connected to the second node, having a second source-drain connected to an elevated positive power supply line, and having a gate;

a fourth transistor having a first source-drain connected to ground, having a second source-drain terminal connected to the output line, and having a gate;

a conductive line connected between the output line and the gate of the third transistor, wherein the circuitry comprises a fifth transistor having a first source-drain connected to the first node and a second source-drain connected to ground and a sixth transistor having a first source-drain connected to the first node and having a second source-drain;

first and second inverters coupled between the second source-drain of the sixth transistor and the input line; and a third inverter coupled between the gate of the fourth transistor and the input line.

10. A booster circuit that receives a digital signal from an oscillator on an input line, that boosts the digital signal received from the oscillator when the oscillator is on to produce a corresponding boosted digital signal on an output line, and that receives a fixed voltage on the input line when the oscillator is off, the booster circuit comprising:

a capacitor connected between a first node and a second node;

a control circuit that monitors voltage across the capacitor and that generates a corresponding control signal to prevent the voltage across the capacitor from rising beyond a desired maximum capacitor voltage; and a transistor having a first source-drain connected to the first node, having a second source-drain connected to a line at an elevated power supply voltage, and having a gate that receives the control signal from the control circuit.

11. A booster circuit that receives a digital signal from an oscillator on an input line, that boosts the digital signal received from the oscillator when the oscillator is on to produce a corresponding boosted digital signal on an output line, and that receives a fixed voltage on the input line when the oscillator is off, the booster circuit comprising:

a capacitor connected between a first node and a second node;

a control circuit that monitors voltage across the capacitor and that generates a corresponding control signal to prevent the voltage across the capacitor from rising beyond a desired maximum capacitor voltage, wherein the booster circuit is formed on a programmable logic device; and a transistor having a first source-drain connected to the first node, having a second source-drain connected to a line at an elevated power supply voltage, and having a gate that receives the control signal from the control circuit, wherein the control circuit comprises:

a voltage divider having a first resistor connected between the first node and a third node and having a second resistor connected between the second node and the third node; and a comparator having a first input connected to the third node, having a second input that receives a reference voltage, and having an output at which the control signal is provided.

12. A booster circuit that receives a digital signal from an oscillator on an input line, that boosts the digital signal received from the oscillator when the oscillator is on to produce a corresponding boosted digital signal on an output line, and that receives a fixed voltage on the input line when the oscillator is off, the booster circuit comprising:

a capacitor connected between a first node and a second node;

a control circuit that monitors voltage across the capacitor and that generates a corresponding control signal to prevent the voltage across the capacitor from rising beyond a desired maximum capacitor voltage; and a transistor having a first source-drain connected to the first node, having a second source-drain connected to a line at an elevated power supply voltage, and having a gate that receives the control signal from the control circuit, wherein the control circuit comprises:

a first resistor coupled between the first node and the third node;

a second resistor coupled between the second node and the third node;

a third resistor coupled between the second node and the third node; and a comparator having a first input connected to the third node, having a second input that receives a reference voltage, and having an output at which the control signal is provided.

13. A booster circuit that receives a digital signal from an oscillator on an input line, that boosts the digital signal received from the oscillator when the oscillator is on to produce a corresponding boosted digital signal on an output line, and that receives a fixed voltage on the input line when the oscillator is off, the booster circuit comprising:

a capacitor connected between a first node and a second node;

a control circuit that monitors voltage across the capacitor and that generates a corresponding control signal to prevent the voltage across the capacitor from rising beyond a desired maximum capacitor voltage; and a first transistor having a first source-drain connected to the first node, having a second source-drain connected to a line at an elevated power supply voltage, and having a gate that receives the control signal from the control circuit, wherein the control circuit comprises:

a first resistor connected to the third node;

a second resistor connected to the third node;

a third resistor connected to the third node;

a second transistor connected between the first resistor and a first one of the first and second nodes, wherein the second transistor has a gate;

a third transistor connected between a power supply line and a second one of the first and second nodes, wherein the third transistor has a gate;

a comparator having a first input connected to the third node, having a second input that receives a reference voltage, and having an output at which the control signal is provided;

an inverter having an input and having an output connected to the gate of the second transistor; and a feedback line that conveys the output signal from the comparator to the gate of the third transistor and to the input of the inverter.

14. Circuitry comprising:

an oscillator that is turned on and off in response to control signals;

a booster circuit that receives a digital input signal from the oscillator and that operates in an oscillator-on mode when the oscillator is on and an oscillator-off mode when the oscillator is off and that produces a corresponding boosted output signal, wherein the booster circuit comprises a capacitor and capacitor protection circuitry that prevents voltages across the capacitor from becoming too large; and a charge pump circuit having a clock input that receives the boosted output signal from the booster circuit wherein the capacitor protection circuitry comprises a control circuit that monitors the voltage across the capacitor when the booster circuit is operated in oscillator-off mode, wherein the control circuit comprises a comparator that generates a control signal when the voltage across the capacitor exceeds a desired maximum operating voltage for the capacitor.

15. Circuitry comprising:

an oscillator that is turned on and off in response to control signals;

a booster circuit that receives a digital input signal from the oscillator and that operates in an oscillator-on mode when the oscillator is on and an oscillator-off mode when the oscillator is off and that produces a corresponding boosted output signal, wherein the booster circuit comprises a capacitor and capacitor protection circuitry that prevents voltages across the capacitor from becoming too large;

a charge pump circuit having a clock input that receives the boosted output signal from the booster circuit; and programmable logic that generates a signal that is applied to the oscillator that determines when the oscillator is on and when the oscillator is off, wherein the capacitor protection circuitry comprises:

a control circuit that monitors the voltage across the capacitor when the booster circuit is operated in the oscillator-off mode, wherein the control circuit comprises a comparator that generates a control signal when the voltage across the capacitor exceeds a desired maximum operating voltage for the capacitor; and a two-transistor circuit that prevents the voltage across the capacitor from exceeding the desired maximum operating voltage for the capacitor when the booster circuit is operated in the oscillator-on mode.

* * * * *